(12) United States Patent
Kain

(10) Patent No.: US 9,497,050 B2
(45) Date of Patent: Nov. 15, 2016

(54) CLOCK DOMAIN BOUNDARY CROSSING USING AN ASYNCHRONOUS BUFFER

(71) Applicant: Xilinx, Inc., San Jose, CA (US)

(72) Inventor: Julian M. Kain, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 994 days.

(21) Appl. No.: 13/625,108

(22) Filed: Sep. 24, 2012

(65) Prior Publication Data

US 2014/0089718 A1    Mar. 27, 2014

(51) Int. Cl.
*G06F 1/04*    (2006.01)
*H04L 25/05*    (2006.01)
*H04L 25/14*    (2006.01)
*G06F 5/06*    (2006.01)

(52) U.S. Cl.
CPC ............... *H04L 25/05* (2013.01); *H04L 25/14* (2013.01); *G06F 5/06* (2013.01)

(58) Field of Classification Search
CPC ...................................................... G06F 1/10
See application file for complete search history.

(56) References Cited

U.S. PATENT DOCUMENTS

| | | | |
|---|---|---|---|
| 5,539,739 A * | 7/1996 | Dike et al. | 370/352 |
| 6,603,706 B1 * | 8/2003 | Nystuen et al. | 365/233.1 |
| 7,594,048 B1 | 9/2009 | Edwards et al. | |
| 8,334,716 B1 * | 12/2012 | Davidson et al. | 327/236 |
| 8,826,057 B1 * | 9/2014 | Chin et al. | 713/400 |
| 2005/0169319 A1 | 8/2005 | Mohamadi | |
| 2007/0139085 A1 * | 6/2007 | Elliot | G06F 1/12 327/100 |
| 2009/0276559 A1 | 11/2009 | Allen, Jr. et al. | |
| 2012/0027066 A1 * | 2/2012 | O'Keeffe | 375/224 |
| 2013/0100948 A1 * | 4/2013 | Irvine | H04J 3/0632 370/350 |

FOREIGN PATENT DOCUMENTS

EP    1 365 555 A1    11/2003

* cited by examiner

*Primary Examiner* — Kim Huynh
*Assistant Examiner* — Eric Chang
(74) *Attorney, Agent, or Firm* — W. Eric Webostad; Gerald Chan

(57) ABSTRACT

An apparatus includes a plurality of channels, where each of the channels includes an asynchronous buffer, a latency determination block, a tap selection circuit, and a variable delay. A latency locator is configured to identify a longest latency from among the channels and is coupled to provide the longest latency to the tap selection circuit of each of the channels. For each of the channels: the latency determination block is coupled to the asynchronous buffer to determine a latency value for the asynchronous buffer; the tap selection circuit is coupled to receive the latency value and the longest latency; the tap selection circuit is coupled to the variable delay; and the tap selection circuit is configured to select a tap of taps of the variable delay responsive to the latency value and the longest latency.

20 Claims, 9 Drawing Sheets

CLOCK DOMAIN BOUNDARY CROSSING USING AN ASYNCHRONOUS BUFFER

TECHNICAL FIELD

The invention relates to integrated circuit devices ("ICs"). More particularly, the invention relates to a clock domain boundary crossing using an asynchronous buffer in an IC.

BACKGROUND

High-speed links, such as 100 Gbps Ethernet links for example, may have wide data paths. These data paths may be internal to an IC. Conventionally, these data paths may be broken into multiple segments, namely data lanes. Such parsing of data paths may be a design's choice and/or may be to comply with a specification. For example, the IEEE 802.3ba-2010 standard specifies that 100 Gbps Ethernet have 20 logical lanes. For this or other protocol reasons, such multiple lanes may take separate physical paths within an IC, and two or more of such lanes may be combined, for example at an input/output ("I/O") interface. For example, for an IC with multiple serial transceivers and multiple clock domains, such multiple lanes may cross one or more of such clock domains. Although a design may attempt to keep all lanes aligned, namely so that all data on a data path encounters equivalent delay, use of first-in, first-out buffers ("FIFOs") to cross clock domain boundaries inherently adds some delay uncertainty for each lane and therefore lane-to-lane latency variation.

Reduction of latency variation in current high-speed designs may be relevant to proper operation and/or specification compliance. Although some variation may be unavoidable, it would still be desirable and useful to provide a reduction in latency variation across clock domain boundaries.

SUMMARY

An apparatus comprising a plurality of channels is described. Each of the plurality of channels includes an asynchronous buffer, a latency determination block, a tap selection circuit, and a variable delay. A latency locator is coupled to the latency determination block and to the tap selection circuit of each of the plurality of channels. The latency locator is configured to identify a longest latency from among the plurality of channels and is coupled to provide the longest latency to the tap selection circuit of each of the plurality of channels. For each of the plurality of channels: the latency determination block is coupled to the asynchronous buffer to determine a latency value for the asynchronous buffer; the tap selection circuit is coupled to receive the latency value and the longest latency; the tap selection circuit is coupled to the variable delay; and the tap selection circuit is configured to select a tap of taps of the variable delay responsive to the latency value and the longest latency.

An apparatus comprising an integrated circuit is also described. The integrated circuit has an asynchronous boundary with at least one first clock domain on an input side of the asynchronous boundary and at least one second clock domain on an output side of the asynchronous boundary. The asynchronous boundary has a plurality of channels with each including an asynchronous buffer, a latency determination block, a tap selection circuit, and a variable delay. The asynchronous boundary has a write data interface and a read data interface. The asynchronous boundary is configured to determine a difference between a read pointer and a write pointer to provide a latency value for each of the plurality of channels. The asynchronous boundary is configured to adjust delay through the asynchronous buffer responsive to the latency value and a longest latency value of the plurality of channels of the asynchronous boundary.

BRIEF DESCRIPTION OF THE DRAWINGS

Accompanying drawings show exemplary embodiments. However, the accompanying drawings should not be taken to limit the embodiments shown, but are for explanation and understanding only.

FIGS. 2-1 through 2-4 are block diagrams depicting respective clock domain boundary crossings.

FIG. 3 is a block diagram depicting an exemplary IC die.

FIGS. 4-1 and 4-2 are signal diagrams depicting respective exemplary data timings.

FIGS. 5-1 and 5-2 are block diagrams depicting exemplary portions of asynchronous boundaries corresponding to data timings.

DETAILED DESCRIPTION

Figure 1:
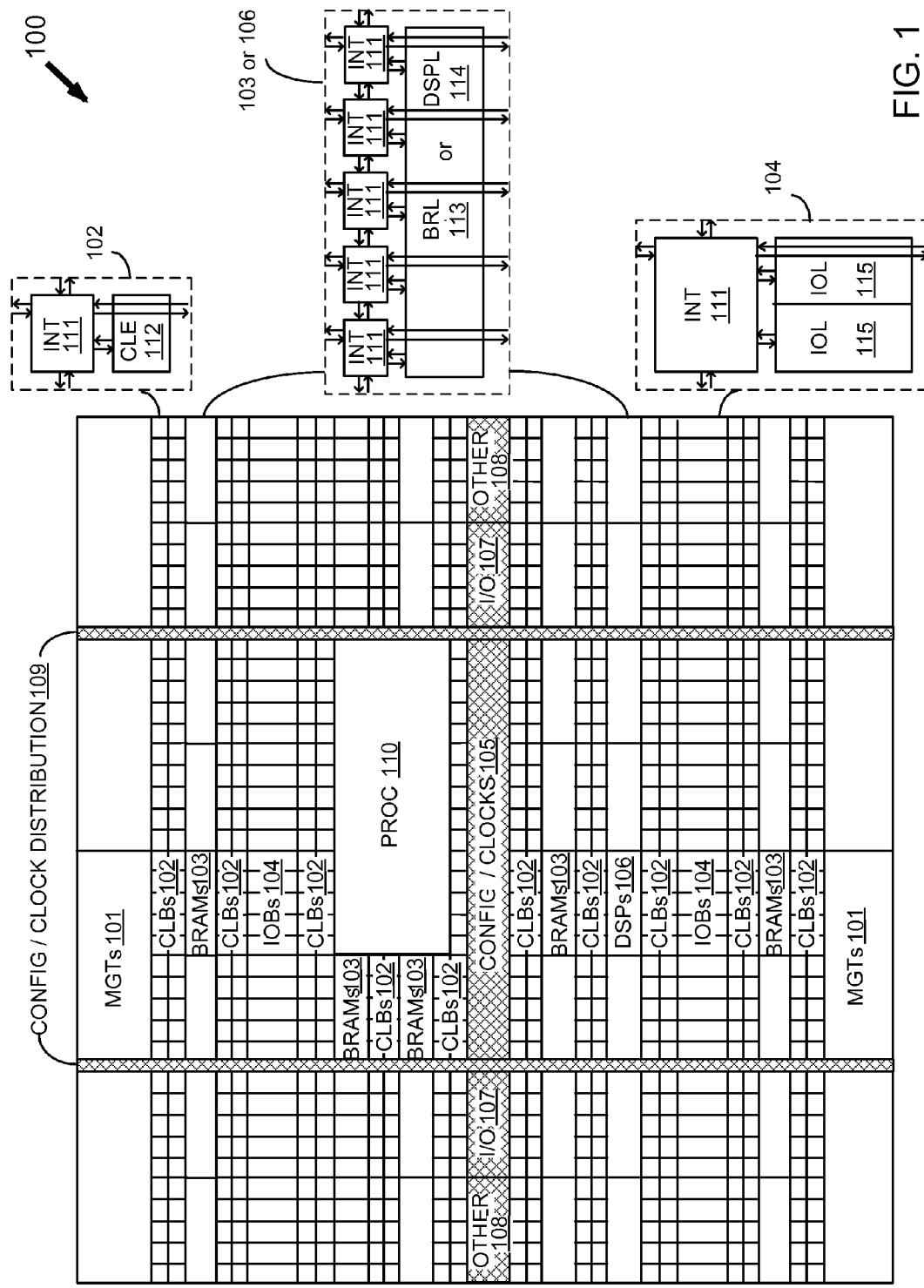
FIG. 1 is a simplified block diagram depicting an exemplary columnar Field Programmable Gate Array ("FPGA") architecture.

In the following description, numerous specific details are set forth to provide a more thorough description of the specific embodiments. It should be apparent, however, to one skilled in the art, that one or more embodiments may be practiced without all the specific details given below. In other instances, well known features have not been described in detail so as not to obscure the one or more embodiments. For ease of illustration, the same number labels are used in different diagrams to refer to the same items; however, in alternative embodiments the items may be different.

Before describing exemplary embodiments illustratively depicted in the several figures, a general introduction is provided to further understanding.

A source of delay uncertainty among different data paths in a grouping of data is an asynchronous boundary. Conventionally, an asynchronous boundary includes a plurality of first-in, first-out buffers ("FIFO"s), where data is clocked into such FIFOs with a write clock and clocked out of such FIFOs with a read clock. Thus, such data crosses two different clock domains, where such data may be clocked in and out of such FIFOs at same or different frequencies. Conventionally, different frequencies are used for read and write clocks, when an input data width is different from an output data width. Where a FIFO is used per lane of parallel data, lane-to-lane variation may occur. Assuming a common write clock and separate read clocks are used for different FIFOs of a grouping of lanes, clock skew and/or pointer passing delay differences between such FIFOs may result in lane-to-lane variation of one or more read positions. However, if such a write clock were five times faster than a read clock, one read position would be equivalent to five write positions.

With the above general understanding borne in mind, various exemplary clock domain boundary crossing are generally described below. Such clock domain boundary crossings may be in either or both transmit or receive directions. Each stage or channel may have an asynchronous buffer, such as an asynchronous FIFO for example. Channels or lanes may be for groupings of data, and the data width of such groupings may be the same or different (asymmetric) on input and output sides of such groupings of channels. Latency of each FIFO of a grouping may be determined and compared to a longest latency among such latencies. Using this latency information, delay adjustment to early arriving data may be made to bring all data of such grouping within closer alignment.

Because one or more of the above-described embodiments are exemplified using a particular type of IC, a detailed description of such an IC is provided below. However, it should be understood that other types of ICs having one or more clock domain boundary crossings may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a horizontal area near the center of the die (shown in FIG. 1) is used for configuration, clock, and other control logic. Vertical columns 109 extending from this horizontal area or column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

FIGS. 2-1 through 2-4 are block diagrams depicting respective exemplary clock domain boundary crossings 200. For purposes of clarity, it shall be assumed that each clock domain boundary crossing 200 is an asynchronous boundary. However, in other embodiments, a write clock signal and a read clock signal may have the same frequency for clocking data into and out of channel FIFOs, where such read clock signal and write clock signal are not the same signal and may be out of phase with respect to one another. However, in such an embodiment, at most a one cycle phase difference may exist.

Data from high-speed communication links may be broken into multiple parallel paths inside an IC, such as FPGA 100 of FIG. 1 for example. Each such data path may encounter a slightly different latency, as described below in additional detail. Even though an example of communication channels is used, it should be understood that any grouping of data that is sent via channels or lanes may be used whether related to networking or not.

Each asynchronous boundary 200 includes a plurality of channels 250-1 through 250-N, for N a positive integer greater than one ("channels 250"). Channels 250-1 through 250-N respectively include asynchronous buffers 210-1 through 210-N ("asynchronous buffers 210"), latency determination blocks 211-1 through 211-N ("latency determination blocks 211"), tap selection circuits 220-1 through 220-N ("tap selection circuits 220"), and variable delays 202-1 through 202-N ("variable delays 202"). In other words, each of channels 250 includes an asynchronous buffer 210, a latency determination block 211, a tap selection circuit 220, and a variable delay 202.

Even though there are N asynchronous buffers 210, groupings of data may be different or asymmetric with respect to input and output sides of such asynchronous buffers. For example, on an input side, N channels 250 may be for five data groupings of 32-bits each, and thus N would equal 160. Continuing the example, on an output side, N channels 250 may be for a single data grouping of 160 bits. This is just one example of an asymmetric asynchronous boundary 200, and these or other sizes of data groupings may be used in other embodiments. Generally, a read clock will be slower than a write clock, as generally data is written into FIFOs in a number of smaller data groupings than such data is read out of FIFOs. However, in other embodiments, data may be written in at a slower frequency than such data is read out of FIFOs.

A latency locator 212 is coupled to each of channels 250. More particularly, latency locator 212 is coupled to latency determination blocks 211 and to tap selection circuits 220 of each of channels 250.

Asynchronous buffers 210 may be asynchronous first-in, first-out memories. Asynchronous buffers may be dedicated memory blocks or configurable memory of programmable resources. Generally, by asynchronous buffer, it is meant where an input data side is clocked by input clock signal and an output data side is clocked by an output clock signal, where such input clock signal and output clock signal are not related. However, for purposes of clarity and not limitation, it shall be assumed that asynchronous buffers are those where one or both of an input side and an output side receive separate input clocks or output clocks, respectively, where such clocks are not all edge aligned to a common reset signal, as described below in additional detail and where such input and output clocks are not related. A clock may be related to another clock if both clocks are sourced from a same clock source, and thus an edge association may be predetermined. Furthermore, an asynchronous buffer may be where a side is clocked by input clock signal and an output data side is clocked by an output clock signal independent of such input clock signal, where such input clock signal and output clock signal are of distinctly different frequencies. Thus, for example, data may be written to an asynchronous buffer 210 synchronously with a write clock signal and may be read from such an asynchronous buffer 210 synchronously with a read clock signal, where such write clock signal and read clock signal are in different clock domains with distinctly different frequencies. This may be to handle asymmetric groupings of data with respect to input and output sides of asynchronous buffers 210.

Variable delays 202 may be shift registers. A latency determination block 211 may be configured to determine a difference in time between arrival of two pointers, such as a read pointer or read address and a write pointer or write address, on opposite sides of an asynchronous buffer 210. It should be understood that these pointers may continue throughout operation of a FIFO. Examples of a latency determination block 211 which may be used are described in U.S. Pat. No. 7,594,048, which is incorporated by reference herein in its entirely for all purposes. In U.S. Pat. No. 7,594,048, a harmonically-unrelated clock signal (not shown) with respect to clock signals 213 and 214 is used to continuously measure and average differences between write and read pointers. Such clock signal (not shown) used for such measurement may be faster than either or both clock signals 213 and 214, and thus a precise FIFO capacity measurement accurate within a small fraction of a clock cycle of either or both of clock signals 213 and 214 may be determined. For an embodiment using an accumulated average, over time a latency value may get more refined, namely more accurate. Thus, even though actual latencies may be relatively static, measurement of such latencies over time may be refined. Along those lines, a data alignment performed after an initial data alignment using more accurate latencies may result in a further adjustment. However, regardless of whether an initial adjustment is sufficient, asynchronous boundary 200 is self-monitoring. Along those lines, should clock skew or data skew be introduced after an initial data alignment, asynchronous boundary 200, without user input, may determine that such clock skew and/or data skew occurred and may self-adjust for it.

Tap selection circuits 220 may be configured to compare delays determined or measured by latency determination blocks 211. Such delays may be fractions of a clock cycle of either an input clock signal or an output clock signal of an asynchronous buffer 210, as described below in additional detail. Latency locator 212 may be configured to identify a longest latency from among latencies determined by latency determination blocks 211 of channels 250 and is coupled to provide the longest latency to tap selection circuits 220 of each of channels 250.

For channel 250-1, a latency determination block 211-1 is coupled to an asynchronous buffer 210-1 to determine a latency value to provide a latency value signal ("latency value") 218-1 for such asynchronous buffer 210-1. Tap selection circuit 220-1 is coupled to receive such latency value 218-1. Tap selection circuit 220-1 is further coupled to receive a longest latency value signal ("longest latency") 219 from latency locator 212. For example, an asynchronous FIFO of asynchronous buffers 210-1 through 210-N having a largest measured difference between a write pointer of pointers 216-1 through 216-N and a corresponding read pointer of pointers 217-1 through 217-N may be identified by latency locator 212. Such latency values 218-1 through 218-N from corresponding latency determination blocks 211-1 through 211-N may be respectively provided to tap selection circuits 220-1 through 220-N and collectively provided to latency locator 212.

Latency locator 212 may be a tree of comparators or an implementation of a comparison algorithm, for example. However, in other embodiments, other circuit structures may be used for latency locator 212. Latency locator 212 may be entirely combinatorial or otherwise configured so as to introduce a small amount of delay, such as to match delay of a latency detection block 211.

Data may be delayed on a write side or a read side of asynchronous buffers 210 for purposes of better data alignment, as described herein. However, for purposes of clarity by way of example and not limitation, it shall be assumed for this example that data 205 is write data and data 225 is read data, even though in other embodiments data 205 delayed may be read data though the direction of the arrows for data 205 and 225 would be reversed from that illustratively depicted.

All channels 250, or more particularly tap selection circuits 220, may compare or otherwise use their FIFO's capacity, namely latency values 218 for example, and a longest latency value 219 from latency locator 212 for determining whether to increase or add delay to one or more of original write data signals 205-1 through 205-N, for N a positive integer greater than one ("original write data 205") on their data path. In another embodiment, original read data 225-1 through 225-N, for N a positive integer greater than one, may be input to corresponding variable delays 202-1 through 202-N.

Tap selection circuit 220-1 is configured to select a tap of taps of variable delay 202-1 responsive to a latency value 218-1 from latency determination block 211-1 and a longest latency value 219 from latency locator 212. Such added delay may be invoked by selecting a different tap, or any tap, of taps of variable delay 202-1, where such selection is made by tap selection circuit 220-1 coupled to variable delay 202-1 for such selection. Each tap may be one clock cycle of delay. In an embodiment, an initial tap, namely a zeroth tap, may be selected as a default having a one clock cycle delay. Thus, an asynchronous buffer or buffers having a longest delay among asynchronous buffers for a grouping of data may be associated with selection of a zeroth tap.

The above description for channel 250-1 may be repeated for each of channels 250-2 through 250-N. Thus, each tap selection circuit 220-1, 220-2, . . . , 220-N may be coupled to a corresponding variable delay 202-1, 202-2, . . . , 202-N, where each such tap selection circuit 220-1, 220-2, . . . , 220-N receives a corresponding latency value 218-1, 218-2, . . . , 218-N and a longest latency value 219 for any tap selection on a channel-by-channel basis. However, for purposes of clarity and not limitation, the above description for each of channels 250-2 through 250-N is not repeated.

Figures 1, 2:
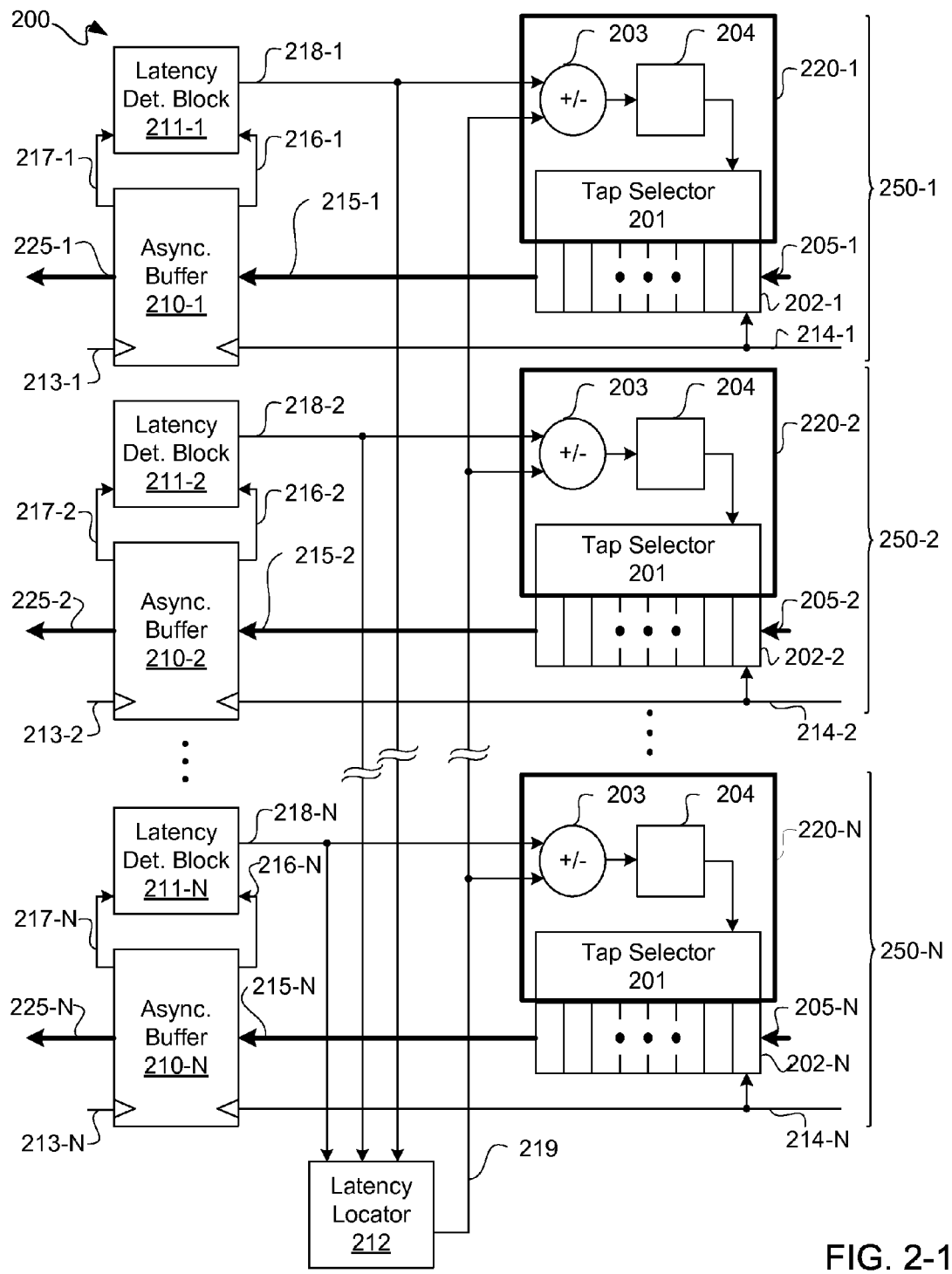
Figure 2:
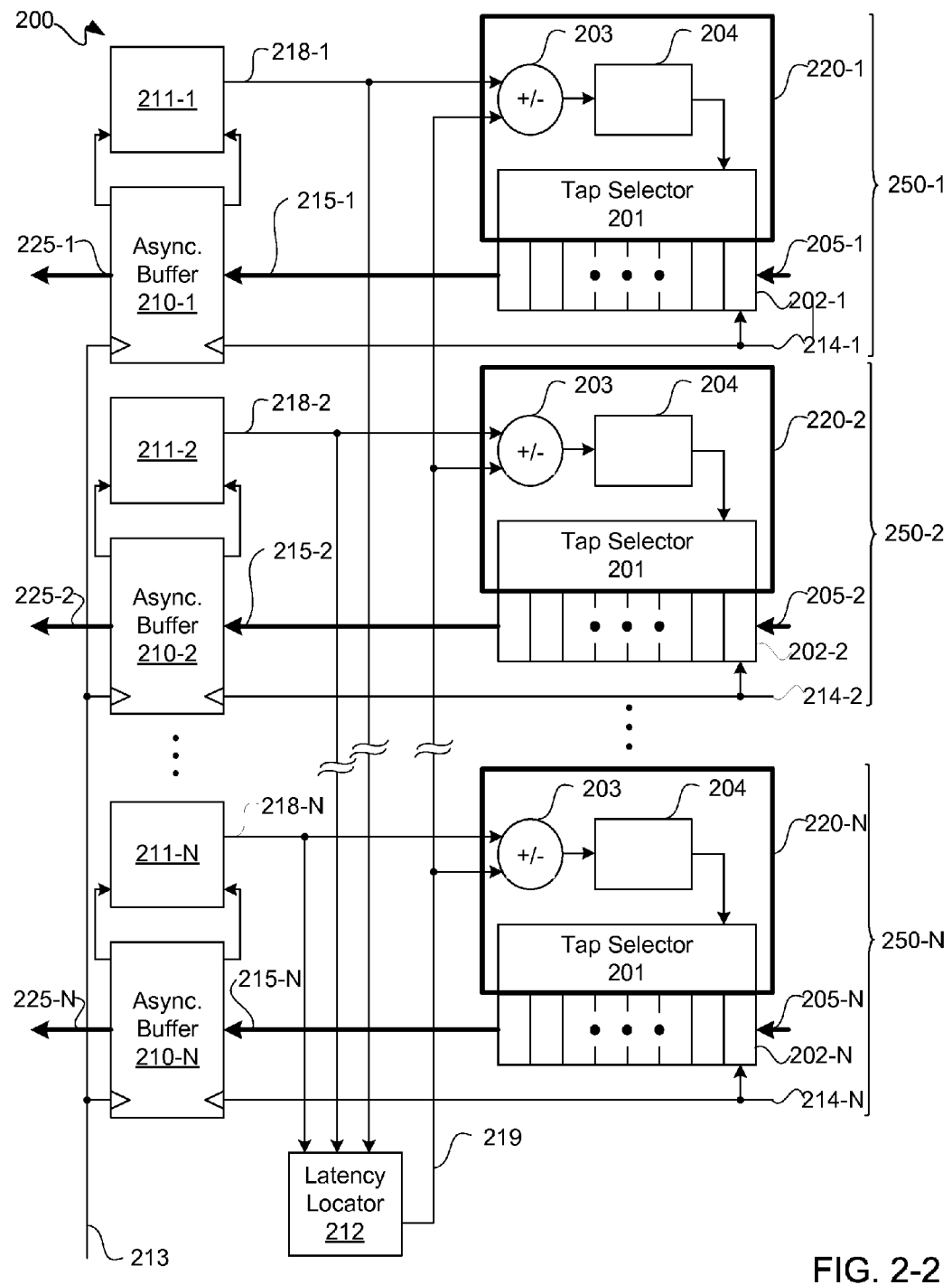

In the block diagram of FIG. 2-1, each of channels 250-1 through 250-N has a corresponding separate write clock signal 214-1 through 214-N and a corresponding separate read clock signal 213-1 through 213-N. For example, original write data 205-1 may be clocked into variable delay 202-1 responsive to a separate write clock signal ("write clock") 214-1, and output from variable delay 202-1 may be provided as delayed write data 215-1. Delayed write data 215-1 may be clocked into an asynchronous FIFO buffer 210-1 responsive to separate write clock 214-1. Further, for purposes of clarity and not limitation, read data 225-1 may be clocked out of asynchronous FIFO buffer 210-1 responsive to a separate read clock signal ("read clock") 213-1. For purposes of clarity by way of example and not limitation, write clock signals 214-1 through 214-N may be sourced from N clock data recovery ("CDR") circuits of MGTs, where there is some skew among such CDR circuits. Thus, data delivered using such recovered clock signals may be skewed, and so such data may be de-skewed as described herein. Along those lines, data arriving earlier than other data may be slowed down in order to more closely align all data in a data grouping.

In the block diagram of FIG. 2-2, each of channels 250-1 through 250-N has a corresponding separate write clock 214-1 through 214-N and a common read clock 213. For example, original write data 205-1 may be clocked into variable delay 202-1 responsive to a separate write clock 214-1, and output from variable delay 202-1 may be provided as delayed write data 215-1. Delayed write data 215-1 may be clocked into an asynchronous FIFO buffer 210-1 responsive to a separate write clock 214-1. Further, for purposes of clarity and not limitation, read data 225-1 may be clocked out of asynchronous FIFO buffer 210-1 responsive to a common read clock 213, where such read clock 213 may be used to clock an output or read side of each of asynchronous buffers 210-1 through 210-N.

Figures 2, 3:
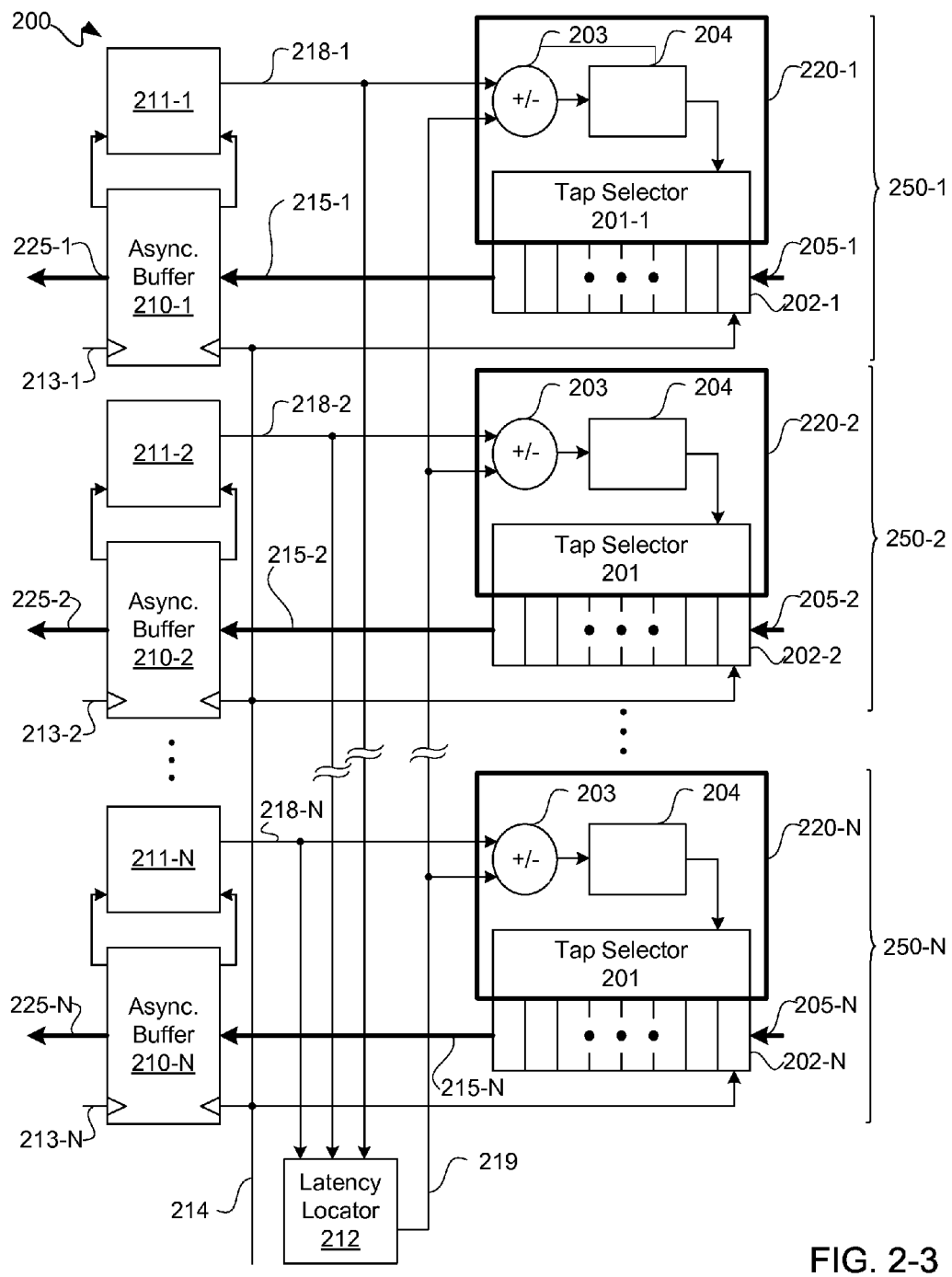

In the block diagram of FIG. 2-3, each of channels 250-1 through 250-N has a corresponding separate read clock 213-1 through 213-N and a common write clock 214. For example, original write data 205-1 may be clocked into variable delay 202-1 responsive to common write clock 214, and output from variable delay 202-1 may be provided as delayed write data 215-1. Delayed write data 215-1 may be clocked into an asynchronous FIFO buffer 210-1 responsive to a common write clock 214. Write clock 214 may be used to clock an input or write side of each of asynchronous buffers 210-1 through 210-N. Further, for purposes of clarity and not limitation, read data 225-1 may be clocked out of asynchronous FIFO buffer 210-1 responsive to a separate read clock 213-1.

Figures 2, 3, 4:
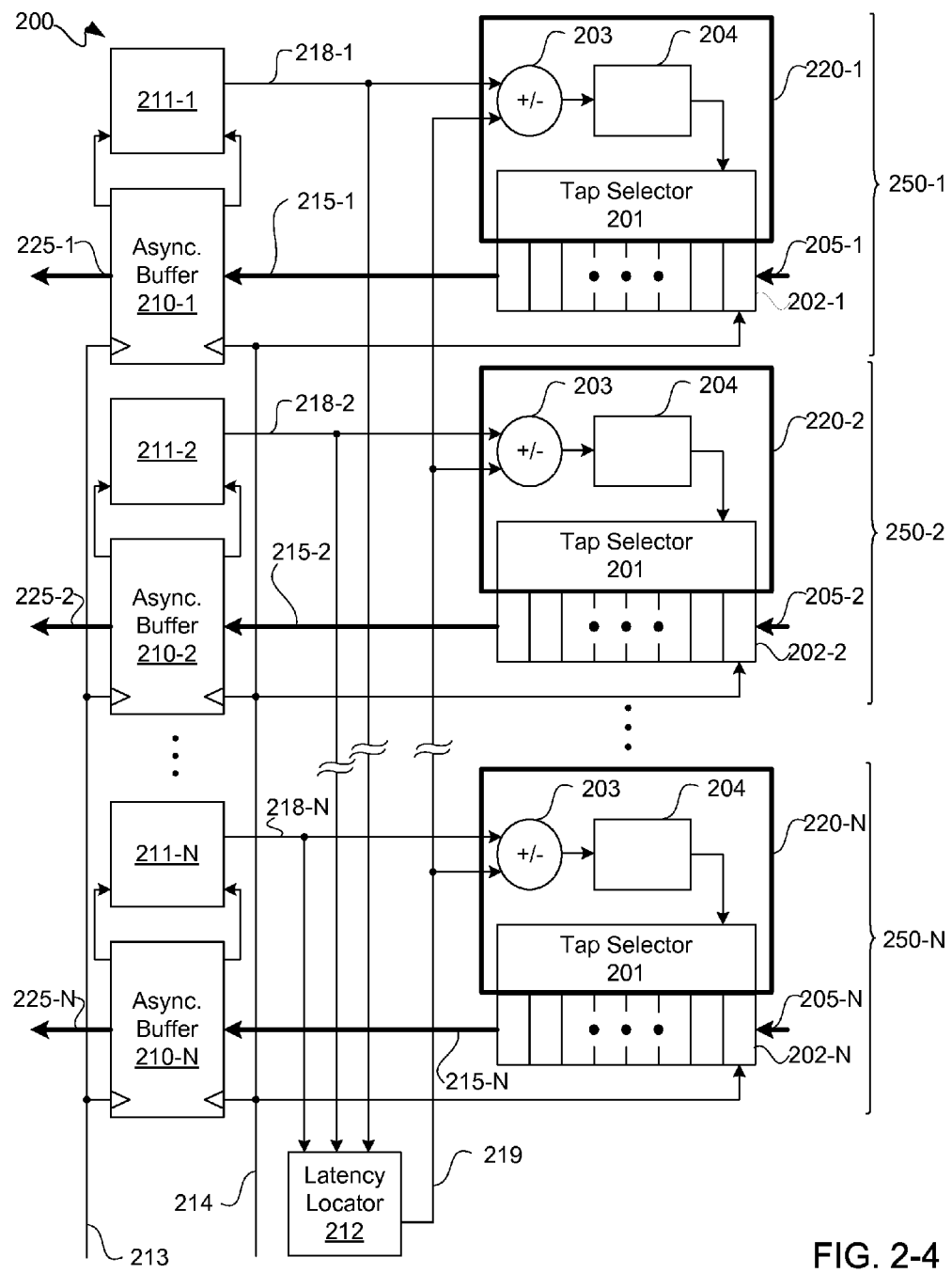
Figure 3:
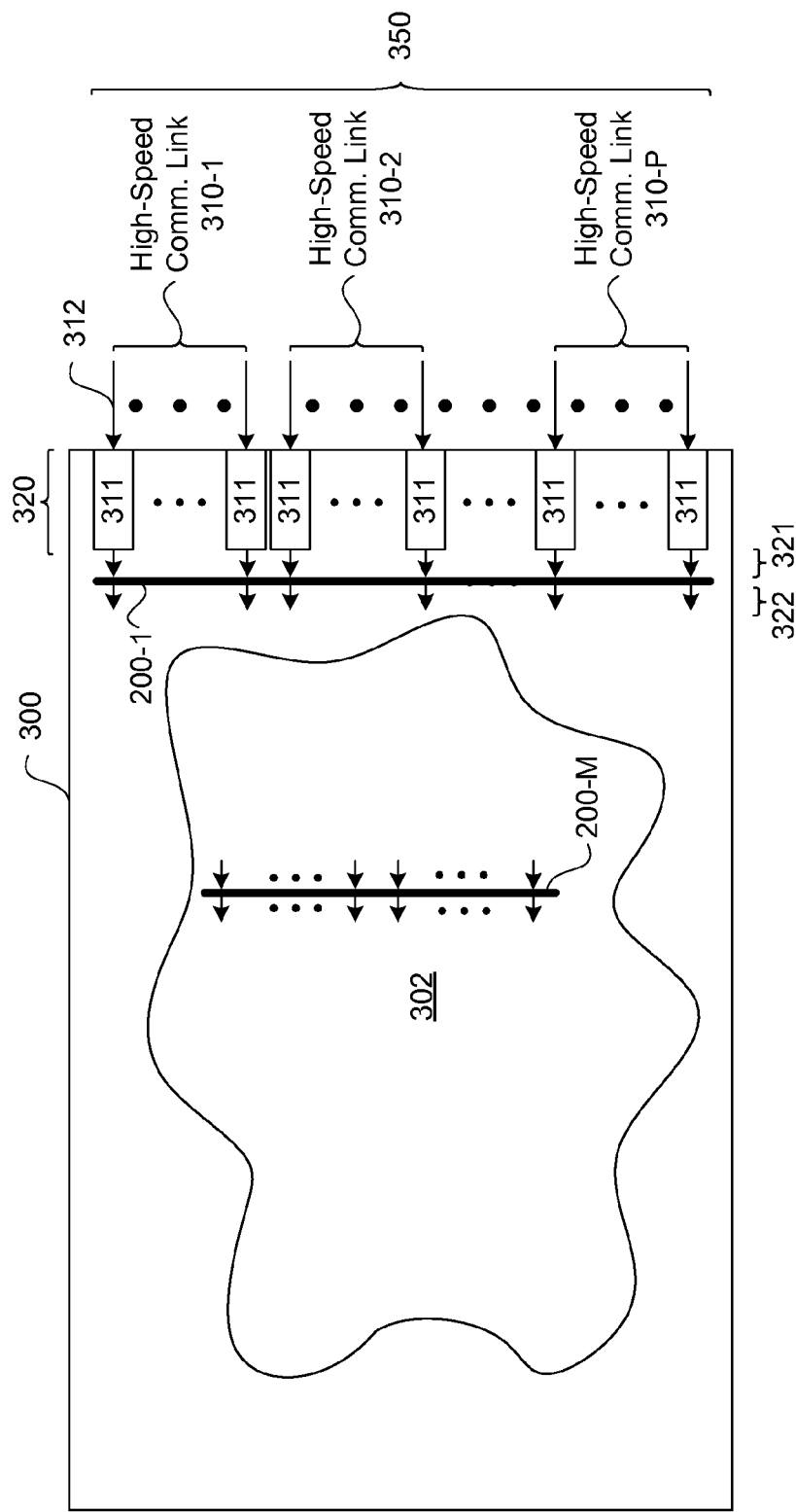
Figures 1, 4:
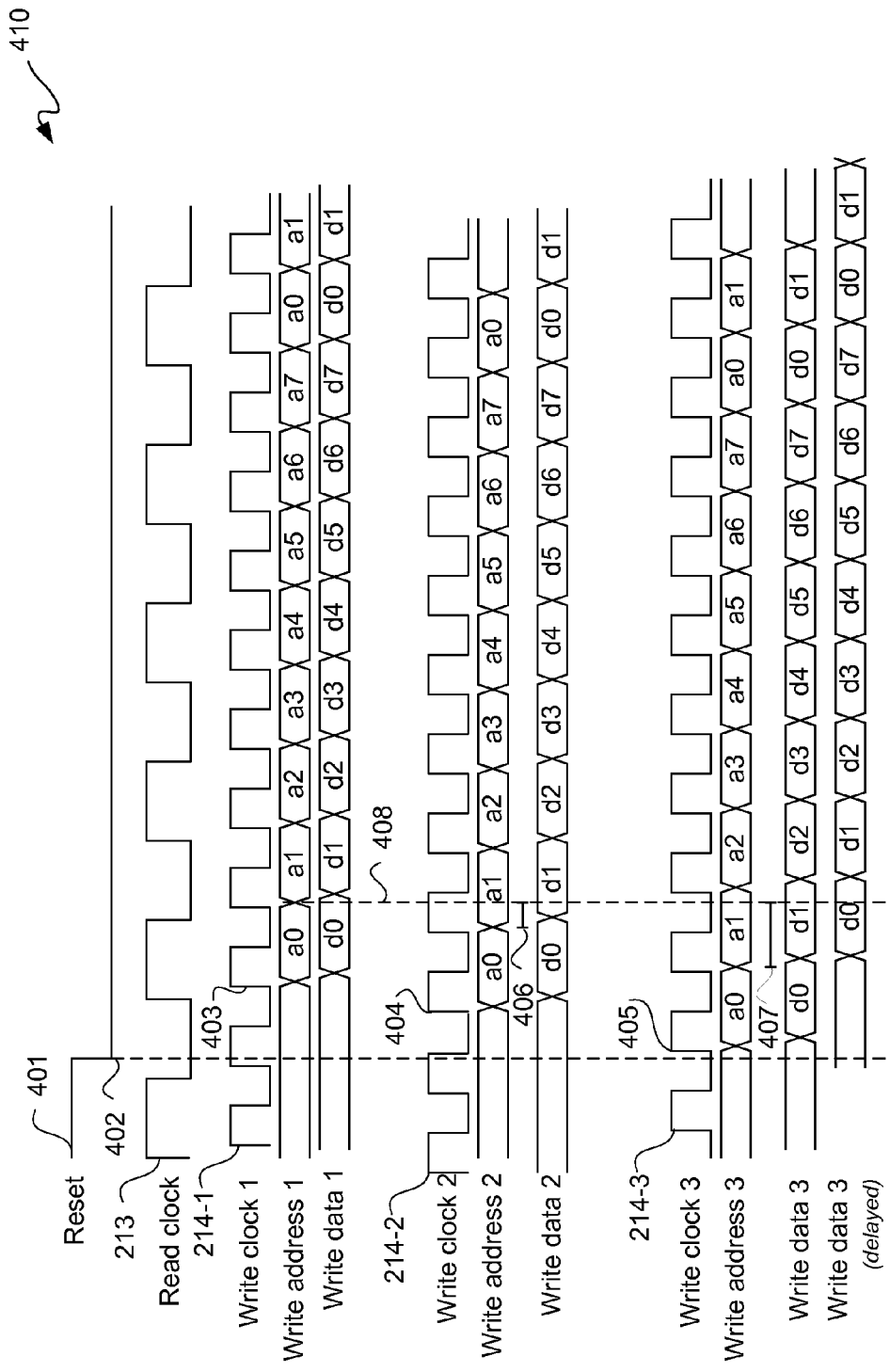
Figures 2, 4:
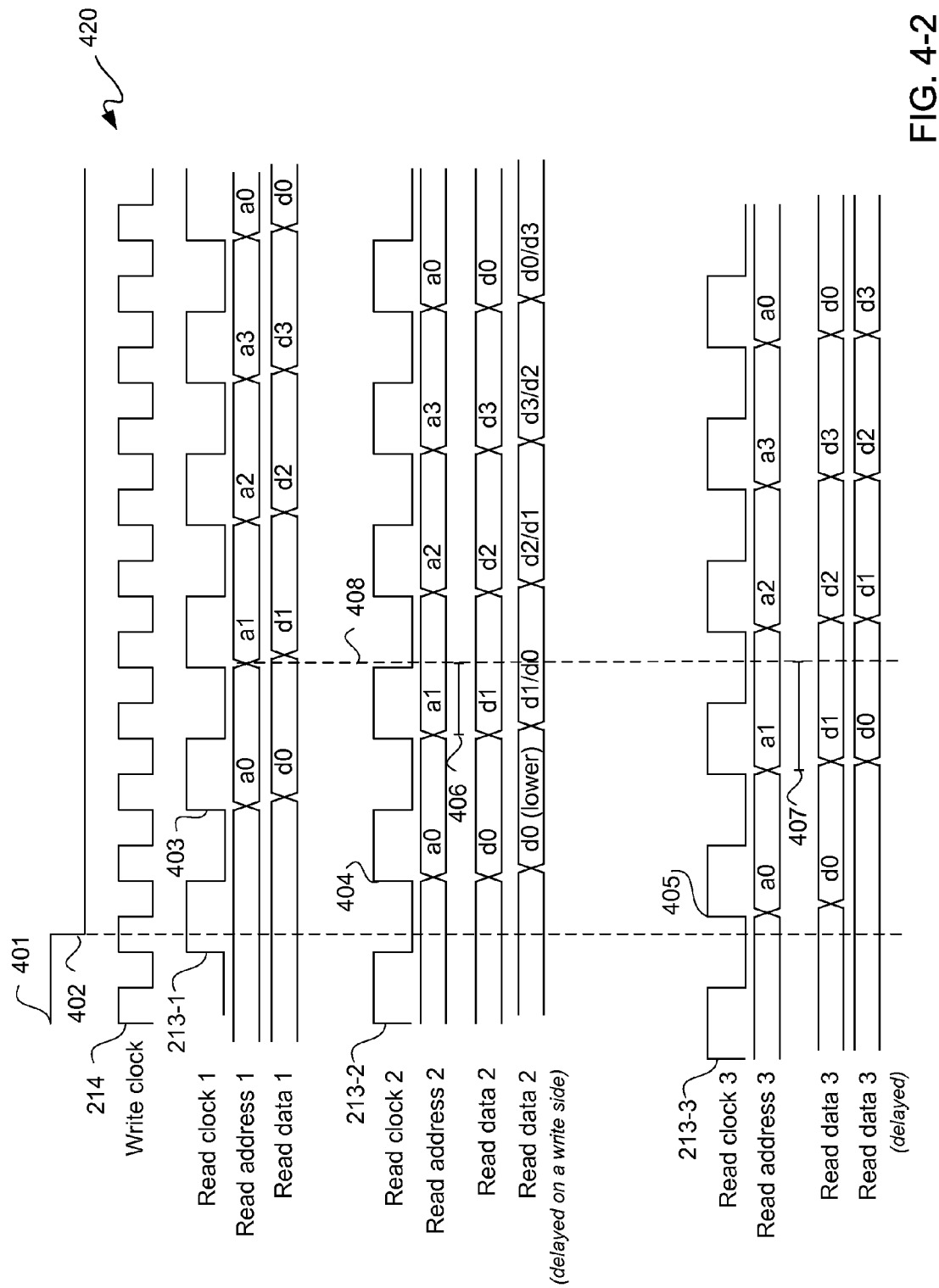

In the block diagram of FIG. 2-4, each of channels 250-1 through 250-N has a common read clock 213 and a common write clock 214. For example, original write data 205-1 may be clocked into variable delay 202-1 responsive to a common write clock 214, and output from variable delay 202-1 may be provided as delayed write data 215-1. Delayed write data 215-1 may be clocked into an asynchronous FIFO buffer 210-1 responsive to common write clock 214. Write clock 214 may be used to clock an input or write side of each of asynchronous buffers 210-1 through 210-N. Further, for purposes of clarity and not limitation, read data 225-1 may be clocked out of asynchronous FIFO buffer 210-1 responsive to a common read clock 213, where such read clock 213 may be used to clock an output or read side of each of asynchronous buffers 210-1 through 210-N.

Suppose that a write address signal of a first channel is less than ½ clock cycle of a write clock earlier than a write address signal of a second channel, and suppose such a write clock for an asynchronous buffer is faster than a read clock for such asynchronous buffer. In such an example, delaying the corresponding write data by one clock cycle of a write clock signal of such first channel would be counterproductive with respect to aligning data written to asynchronous buffers of such first and second channel. Along those lines, each tap selection circuit 220 may be configured to determine whether delay through an asynchronous buffer 220 of a channel 250 of a plurality of channels differs by less than a predetermined portion of a clock cycle from a longest latency.

Along those lines, a tap selection circuit 220, such as tap selection circuit 220-1 for example, may include a subtractor 203 coupled to receive an associated latency value, such as latency value 218-1 for example, and a longest latency value 219 to determine a difference, such as for example to subtract longest latency value 219 from latency value 218-1. This difference may be output from subtractor 203 to a comparator circuit 204 of such tap selection circuit 220. Comparator circuit 204 may be configured to determine if the difference output is less than a predetermined value. In an example, a −½ clock cycle delay may be used, where the negative sign indicates data is early. However, in other embodiments, another portion of a clock cycle, read or write clock, may be used. Furthermore, a portion of clock cycle of a faster or slower may be used. Generally, a threshold may be set where an increment of a tap improves data alignment with respect to data of an asynchronous buffer having a longest latency. Output of comparator circuit 204 may be provided to a tap selector 201 of a tap selection circuit, such as tap selection circuit 220-1 for example.

Additionally or alternatively, a tap selection circuit 220, such as tap selection circuit 220-1 for example, may include an adder 203 coupled to receive an associated latency value, such as latency value 218-1 for example, and a longest latency value 219 to determine a sum, such as for example to add longest latency value 219 to latency value 218-1. This sum may be output from adder 203 to a comparator circuit 204 of such tap selection circuit 220. In an embodiment, comparator circuit 204 may include a lookup table which is configured to determine which tap to select responsive to a sum output from adder 203. In another embodiment, an adder 203 may be used where negative numbers are represented by a one's or two's complement for example. Output of comparator circuit 204 may be provided to a tap selector 201 of a tap selection circuit, such as tap selection circuit 220-1 for example.

Tap selector 201 may be configured to change tap selection of an associated variable delay 202. For example, a tap selector 201 may be coupled to receive a control signal from comparator 204 for tap selection. Both a tap selection circuit 220 and a tap selector 201 may be coupled and configured to control tap selection of a tap of taps of variable delay 202.

Generally, after an initial power up or reset, latency among asynchronous FIFO buffers 210 may be static. This assumes that writes and reads are continuously performed, such as for periods of time when both a write enable signal and a read enable signal are active or asserted (e.g., held at a logic high). Thus, after an initial operation, data may be aligned and generally stay aligned for such period of continued assertion of write and read enable signals. However, asynchronous boundaries 200 are self-monitoring, so any subsequent change in data alignment may be accounted for with a subsequent data re-alignment. Thus, if write and read enable signals are subsequently de-asserted and re-asserted, an asynchronous boundary 200 may effectively automatically reset itself.

FIG. 3 is a block diagram depicting an exemplary IC die 300. IC die 300 may include an input/output interface 320. Input/output interface 320 may include a plurality of MGTs, IOBs, or other types of input/output interface blocks 311. Interface blocks 311 may be coupled to a plurality of communication links 310-1 through 310-P, for P a positive integer greater than one ("communication links 310"). Each of communication links 310 may include a plurality of channels 312, and a grouping of communication links 310 may be for a grouping of data 350. Continuing the above example, each communication link 310 may be 32 bits wide, namely 32 channels or lanes 312, and five of communication links 310 input to an asynchronous boundary 200 may be grouped to provide a 160 bit wide output from such an asynchronous boundary 200. Channels 312 in this exemplary block diagram are communication channels; however, other types of data channels may be used.

Input/output interface 320 may be coupled to an asynchronous boundary 200-1. There may be asynchronous boundaries 200-1 through 200-M, for M a positive integer greater than one ("asynchronous boundaries 200"), in IC die 300. Each asynchronous boundary 200 has at least one write clock domain on an input side of thereof and at least one read clock domain on an output side thereof. Thus, each asynchronous boundary 200 has a write data interface 321 and a read data interface 322. Each asynchronous boundary 200 has a plurality of channels 312 with each including an asynchronous buffer, a latency determination block, a tap selection circuit, and a variable delay, which may be as previously described herein.

As previously described herein, each asynchronous boundary 200 is configured to determine a difference between a read pointer and a write pointer to provide a latency value for each of channels 312. Furthermore, as previously described herein, each asynchronous boundary 200 is configured to adjust delay through one or more asynchronous buffers responsive to an associated latency value and a longest latency value of such asynchronous buffers of a grouping of channels 312 of an asynchronous boundary 200. As previously described herein, a tap selection circuit is configured to adjust delay through an asynchronous buffer of a channel of channels 312 when an associated latency value for such channel differs from a longest latency value of a grouping of such channels 312 by less than (or more than depending on implementation) a predetermined portion of a clock cycle.

IC die 300 may include a user's circuit design 302 instantiated using programmable resources, and such programmable resources may be of an FPGA for example. A user's design may be benefited by having one or more asynchronous boundaries 200 as described herein. Furthermore, an asynchronous interface 200-1 as described herein may be coupled to such a user's design.

In FIG. 3, data is depicted flowing into IC die 300. However, data may likewise flow out of IC die 300 through one or more asynchronous boundaries 200.

As there may be multiple clock domain crossings, there may be multiple instances where data and/or clock may be skewed, and such skew may be cumulative for multiple clock domain crossings. Thus, by having multiple asynchronous boundaries 200, such skew may be reduced, and such accumulation may be avoided. Furthermore, as asynchronous boundaries 200 are self-monitoring, any variation among such multiple clock domain crossings may be adjusted.

Figures 2, 5:
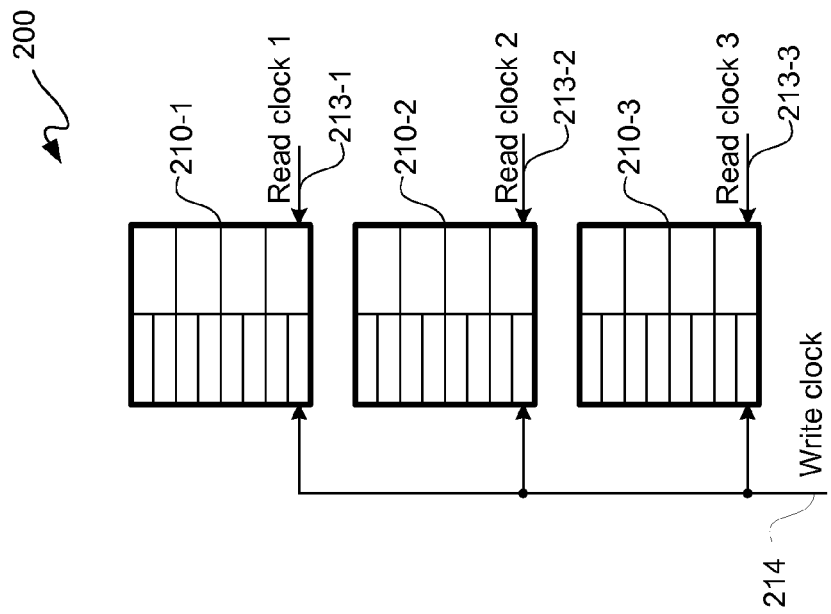
Figures 1, 5:
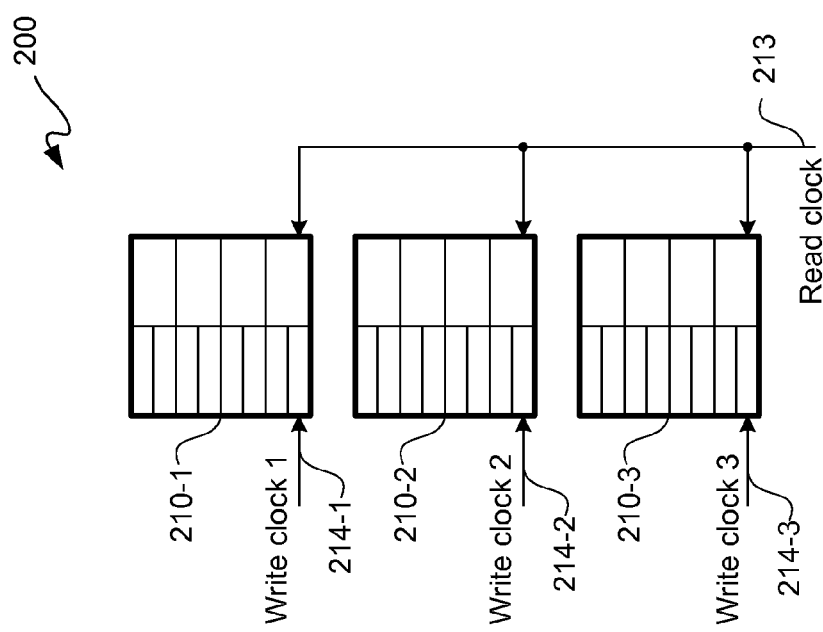

FIGS. 4-1 and 4-2 are signal diagrams depicting respective exemplary embodiments of data timings 410 and 420. FIGS. 5-1 and 5-2 are block diagrams depicting exemplary portions of asynchronous boundaries 200 corresponding to data timings 410 and 420.

With reference to FIG. 5-1, an input clock signal 214-1, namely "write clock 1," is input to an asynchronous buffer 210-1; write clock signal 214-2, namely "write clock 2," is input to an asynchronous buffer 210-2; and write clock signal 214-3, namely "write clock 3," is input to an asynchronous buffer 210-3. An output clock signal 213, namely "read clock," is input to each of asynchronous buffers 210-1 through 210-3. For each of asynchronous buffers 210-1 through 210-3, there are two write locations for each read location.

With reference to FIG. 4-1, which is for asynchronous buffer 200 of FIG. 5-1, separate read and write clock domain synchronization is assumed. Read clock signal 213 operates at a slower frequency, namely one-half the frequency, of each of write clock signals 214-1 through 214-3, and generally each of write clock signals 214-1 through 214-3 are all at the same frequency.

At time 402, a reset signal 401 transitions from a logic high to a logic low, and thus releases FIFO asynchronous buffers 210-1 through 210-3 from a reset state. Each of FIFO asynchronous buffers 210-1 through 210-3 is leading or rising edge triggered.

For FIFO asynchronous buffer 210-1, a first rising edge 403 of a write clock signal 214-1 after exiting a reset state is used to start clocking in an address a0 and data d0 respectively of a write address 1 signal and a write data 1 signal. In this embodiment, adjustment of delay of data is on the write or input side, as write clock signal 214-1 is faster than read clock signal 213. In other words, a faster signal allows for finer granularity of delay adjustment, as each delay element of a shift register delay is one clock cycle of a write clock signal in this embodiment. However, in other embodiments, a slower clock signal, whether a write clock signal or a read clock signal, may be the side on which an adjustment may be made in terms of delaying output data at the expense of having larger time intervals of delay adjustment.

In this example, as write data d0 of write data 1 is the latest data of all three write channels 1 through 3 to be written to an asynchronous buffer 210-1 of asynchronous buffers 210-1 through 210-3, no tap adjustment is made to delay data associated with channel 1, namely no tap is selected to delay or further delay write data 1. In other words, from time 408 when address a0 transitions to address a1 on write address signal 1, address a0 transitions to address a1 on write address signal 2 an amount of time 406 earlier. Likewise, from time 408 when address a0 transitions to address a1 on write address signal 1, address a0 transitions to address a1 on write address signal 3 an amount of time 407 earlier. In this example, without any added delay, the earliest data, such as d0 on write data 3, is written to asynchronous buffer 210-3 before data d0 on write data 1 is written to asynchronous buffer 210-1 and before data d0 on write data 2 is written to asynchronous buffer 210-2.

For FIFO asynchronous buffer 210-2, a first rising edge 404 of a write clock signal 214-2 after exiting a reset state is used to start clocking in data d0 at an address a0 respectively of a write data 2 signal and a write address 2 signal. Again, in this embodiment, adjustment of delay of data is on the write or input side, as write clock signal 214-2 is faster than read clock signal 213. As FIFO asynchronous buffer 210-2 comes out of a reset state with the alignment illustratively depicted, no tap adjustment is made to further delay data. In other words, write data 2 is less than ½ of a clock cycle of a write clock earlier than write data 1. Thus, delaying write data 2 by one clock cycle of write clock signal 214-2 would be counterproductive with respect improving alignment of data written to asynchronous buffers 210-1 through 210-3.

For FIFO asynchronous buffer 210-3, a first rising edge 405 of a write clock signal 214-3 after exiting a reset state is used to start clocking in data d0 at an address a0 respectively of a write data 3 signal and a write address 3 signal. Again, in this embodiment, adjustment of delay of data is on the write or input side, as write clock signal 214-3 is faster than read clock signal 213. As FIFO asynchronous buffer 210-3 comes out of a reset state with the alignment illustratively depicted, a tap adjustment is made to further delay data. In other words, write data 3 is more than ½ of a clock cycle of a write clock earlier than write data 1. Thus, delaying write data 3 by one clock cycle of write clock signal 214-3 would be useful with respect to aligning data written to asynchronous buffers 210-1 through 210-3.

To illustratively depict the impact of this added delay, a delayed version of write data 3 signal is illustratively depicted. After delaying write data 3, namely write data 3 (delayed), data d0 is at the location of data d1 of write data 3 had no delay been added. Thus, by adding a tap of delay to write data 3 to provide write data 3 (delayed), all d0s, and subsequent data, of channels 1 through 3 may be more closely aligned than without adding further delay to write data 3 on channel 3.

With reference to FIG. 5-2, an input clock signal 214, namely "write clock," is input to asynchronous buffers 210-1 through 210-3. An output clock signal 213-1, namely "read clock 1," is input to asynchronous buffer 210-1; an output clock signal 213-2, namely "read clock 2," is input to asynchronous buffer 210-2; and an output clock signal 213-3, namely "read clock 3," is input to asynchronous buffer 210-3. For each of asynchronous buffers 210-1 through 210-3, there are two write locations for each read location.

With reference to FIG. 4-2, which is for asynchronous buffer 200 of FIG. 5-2, separate read and write clock domain synchronization is assumed. Read clock signals 213-1 through 213-3 generally operate at the same frequency, each of which operates at a slower frequency, namely one-half the frequency, of write clock signal 214.

At time 402, reset signal 401 transitions from a logic high to a logic low, and thus releases FIFO asynchronous buffers 210-1 through 210-3 from a reset state. Each of FIFO asynchronous buffers 210-1 through 210-3 is leading or rising edge triggered.

For FIFO asynchronous buffer 210-1, a first rising edge 403 of a read clock signal 213-1 after exiting a reset state is used to start clocking in an address a0 and data d0 respectively of a read address 1 signal and a read data 1 signal. In this example, the adjustment of delay of data is on the read or output side, even though write clock signal 214 is faster than each of read clock signals 213-1 through 213-3. In other words, using a slower signal means that a lesser degree of granularity of delay adjustment is available, as each delay element of a shift register delay is one clock cycle of a slower read clock signal in this embodiment.

In this example, read data d0 of read data 1 is the latest of all three read channels 1 through 3 to be read from an asynchronous buffer 210-1 of asynchronous buffers 210-1 through 210-3, so no tap adjustment is made to delay data associated with channel 1, namely no tap is selected to delay or further delay read data 1. In other words, from time 408 when address a0 transitions to address a1 on read address signal 1, address a0 transitions to address a1 on read address signal 2 an amount of time 406 earlier. Likewise, from time 408 when address a0 transitions to address a1 on read address signal 1, address a0 transitions to address a1 on read address signal 3 an amount of time 407 earlier. In this example, the earliest data is written to asynchronous buffer 210-3, as amount of time 407 is greater than amount of time 406.

For FIFO asynchronous buffer 210-2, a first rising edge 404 of a read clock signal 213-2 after exiting a reset state is used to start clocking in data d0 at an address a0 respectively of a read data 2 signal and a read address 2 signal. Again, in this example, the adjustment of delay of data is on the read or output side. As FIFO asynchronous buffer 210-2 comes out of a reset state with the alignment illustratively depicted, no tap adjustment is made to further delay data. In other words, read data 2 is less than ½ of a clock cycle of a read clock earlier than read data 1. Thus, delaying read data 2 by one clock cycle of read clock signal 213-2 would be counterproductive with respect to aligning data read from asynchronous buffers 210-1 through 210-3.

However, it would be advantageous to delay data on a write side of asynchronous buffer 210-2 by one clock cycle of write clock signal 214, as generally indicated by read data signal 2 (delayed on a write side). As illustratively depicted with read data signal 2 (delayed on a write side), data alignment on a data output or read side may be improved by delaying on a faster input or write side. More generally, delaying on a faster side, whether input or output side, may provide for finer grained alignment.

For FIFO asynchronous buffer 210-3, a first rising edge 405 of a read clock signal 213-3 after exiting a reset state is used to start clocking in data d0 at an address a0 respectively of a read data 3 signal and a read address 3 signal. Again, in this example, the adjustment of delay of data is on the read or output side. As FIFO asynchronous buffer 210-3 comes out of a reset state with the alignment illustratively depicted, a tap adjustment is made to further delay data. In other words, read data 3 is more than ½ of a clock cycle of a read clock earlier than read data 1. Thus, delaying read data 3 by one clock cycle of read clock signal 214-3 would be useful with respect to aligning data written to asynchronous buffers 210-1 through 210-3.

To illustratively depict the impact of this added delay, a delayed version of read data 3 signal is illustratively depicted. After delaying read data 3 to provide read data 3 (delayed), data d0 of read data 3 (delayed) is at the location of where data d1 read data 3 would be had no delay been added. Thus, by adding a tap of delay to read data 3 to provide read data 3 (delayed), all d0s, and subsequent data, of channels 1 through 3 may be more closely aligned than without adding further delay to read data 3 on channel 3.

In another embodiment, where delay is added on a faster write side, two taps of write delay may be used, where a write clock signal is twice the frequency of a read clock signal. Of course, the number of taps used on a faster side may vary depending on the frequency ratio of read-to-write clock domains.

Furthermore, addresses are incremented as before, but data being written or read into such addresses is effectively "earlier" than such data was before, because only data is further delayed. In other words, only data is further delayed for data alignment as described herein, and no corresponding delay is added to addresses respectively associated with such delayed data. Effectively, this is how a delay adjustment is made based on an existing measured difference between write and read addresses, without affecting an address. If addresses were delayed, this would change the measurement between read and write pointers, which may cause a kind of oscillation in adjustment.

While the foregoing describes exemplary apparatus, other and further embodiments in accordance with the one or more aspects may be devised without departing from the scope of the present invention, which is determined by the claims that follow and equivalents thereof. Trademarks are the property of their respective owners.

What is claimed is:

1. An apparatus, comprising:
    a plurality of channels;
    each of the plurality of channels including an asynchronous buffer, a latency determination block, a tap selection circuit, and a variable delay, wherein the asynchronous buffer has an input side associated with a first time domain and an output side associated with a second time domain, the first and second time domains having different respective frequencies;
    a latency locator coupled to the latency determination block and to the tap selection circuit of each of the plurality of channels;
    wherein the latency locator is configured to identify a longest latency from among the plurality of channels and is coupled to provide the longest latency to the tap selection circuit of each of the plurality of channels; and
    wherein for each of the plurality of channels:
        the latency determination block is coupled to the asynchronous buffer to determine a latency value for the asynchronous buffer;
        the tap selection circuit is coupled to receive the latency value and the longest latency;
        the tap selection circuit is coupled to the variable delay; and
        the tap selection circuit is configured to select a tap of the variable delay responsive to the latency value and the longest latency.

2. The apparatus according to claim 1, wherein the tap selection circuit is configured to determine whether delay through the asynchronous buffer of a channel of the plurality of channels differs by less than a predetermined portion of a clock cycle from the longest latency.

3. The apparatus according to claim 2, wherein the channel is a communication channel.

4. The apparatus according to claim 2, wherein the channel is for a grouping of data.

5. The apparatus according to claim 1, wherein the asynchronous buffer of each of the plurality of channels is clocked by a first common clock signal on the input side and a second common clock signal on the output side.

6. The apparatus according to claim 1, wherein the asynchronous buffer of each of the plurality of channels is clocked by a first separate clock signal on the input side and a separate clock signal on the output side.

7. The apparatus according to claim 1, wherein the asynchronous buffer of each of the plurality of channels is clocked by a common clock signal on the input side and a separate clock signal on the output side.

8. The apparatus according to claim 1, wherein the asynchronous buffer of each of the plurality of channels is clocked by a separate clock signal on the input side and a common clock signal on the output side.

9. The apparatus according to claim 1, wherein the tap selection circuit comprises:
    a subtractor coupled to receive the latency value and the longest latency to subtract the longest latency value from the latency value to determine a difference; and
    a comparator circuit configured to determine if the difference is less than a predetermined value.

10. The apparatus according to claim 9, wherein the predetermined value is a portion of a clock cycle.

11. The apparatus according to claim 1, wherein the tap selection circuit comprises:
- an adder coupled to receive the latency value and the longest latency to add the longest latency value to the latency value to determine a sum; and
- a comparator circuit configured to determine if the sum is less than a predetermined value.

12. The apparatus according to claim 1, wherein the variable delay is coupled to receive write data to be delayed responsive to the tap selected.

13. The apparatus according to claim 1, wherein the variable delay is coupled to receive read data to be delayed responsive to the tap selected.

14. The apparatus according to claim 1, wherein the input side of the asynchronous buffer is clocked with a first clock signal in the first time domain, and the output side of the asynchronous buffer is clocked with a second clock signal in the second time domain.

15. An apparatus, comprising:
- an integrated circuit having an asynchronous boundary with at least one first clock domain on an input side of the asynchronous boundary and at least one second clock domain on an output side of the asynchronous boundary, wherein a frequency of the at least one first clock domain and a frequency of the at least one second clock domain are different;
- wherein the asynchronous boundary has a plurality of channels with each including an asynchronous buffer, a latency determination block, a tap selection circuit, and a variable delay;
- wherein the asynchronous boundary has a write data interface and a read data interface;
- wherein the asynchronous boundary is configured to determine a difference between a read pointer and a write pointer to provide a latency value for each of the plurality of channels; and
- wherein the asynchronous boundary is configured to adjust delay through the asynchronous buffer responsive to the latency value and a longest latency value of the plurality of channels of the asynchronous boundary, and wherein the tap selection circuit in at least one of the plurality of channels is configured to receive the latency value from the corresponding latency determination block, and to also receive the longest latency value.

16. The apparatus according to claim 15, wherein the tap selection circuit is configured to adjust delay through the asynchronous buffer of a channel of the plurality of channels when the latency value for the channel differs from the longest latency value of the plurality of channels by less than a predetermined portion of a clock cycle.

17. The apparatus according to claim 15, wherein:
- the predetermined portion of the clock cycle is for a clock signal of the at least one first clock domain on the input side; and
- the frequency of the at least one first clock domain is faster than the frequency of the at least one second clock domain.

18. The apparatus according to claim 15, wherein:
- the predetermined portion of the clock cycle is for a clock signal of the at least one first clock domain on the input side; and
- the frequency of the at least one first clock domain is slower than the frequency of the at least one second clock domain.

19. The apparatus according to claim 15, wherein:
- the input side is for the write interface; and
- the output side is for the read interface.

20. The apparatus according to claim 15, wherein the asynchronous boundary includes a latency locator coupled to each of the plurality of channels to obtain the latency value therefor from each to determine the longest value of the plurality of channels.

* * * * *